United States Patent [19]

Phillips

[11] Patent Number: 4,613,913

[45] Date of Patent: Sep. 23, 1986

[54] DATA ENCODING AND DECODING SCHEME

[75] Inventor: Alan C. Phillips, Los Altos, Calif.

[73] Assignee: Etak, Inc., Menlo Park, Calif.

[21] Appl. No.: 648,002

[22] Filed: Sep. 5, 1984

[51] Int. Cl.[4] .............................................. G11B 5/09
[52] U.S. Cl. ...................................... 360/51; 360/40; 360/41
[58] Field of Search ............................ 360/40, 41, 51

[56] References Cited

U.S. PATENT DOCUMENTS 3,641,526  2/1972  Bailey et al. ......................... 360/51
3,815,108  6/1974  McGrath et al. ..................... 360/51
4,053,944  10/1977  Dixon ................................. 364/900

OTHER PUBLICATIONS

"Second Generation DNC Read/Write Electronics", by R. Barey et al., HP Journal, Jan. 1984.

Primary Examiner—Vincent P. Canney
Attorney, Agent, or Firm—Fliesler, Dubb, Meyer & Lovejoy

[57] ABSTRACT

Digital data formatted on a data storage medium, in which the medium has a plurality of bit cells and the data format is such that groups of n data bits of an N-bit data word are stored over n consecutive bit cells, respectively, and a clock information bit is stored between the groups at every n+1 bit cell. A decoding apparatus includes circuitry for reading the digital data and producing an analog signal corresponding to the n data bits and the clock information bit, circuitry for reconstructing the digital data in response to the analog signal, and circuitry for producing data-ready pulses at a time corresponding to the bit cells storing the n data bits and for inhibiting the data-ready pulses at a time corresponding to the bit cell storing the clock information bit.

12 Claims, 11 Drawing Figures

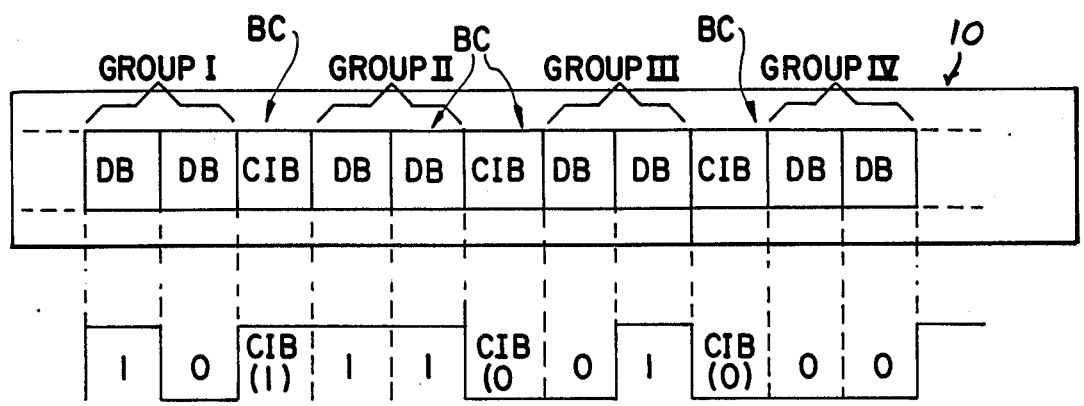
FIG. 1A
FIG. 1B
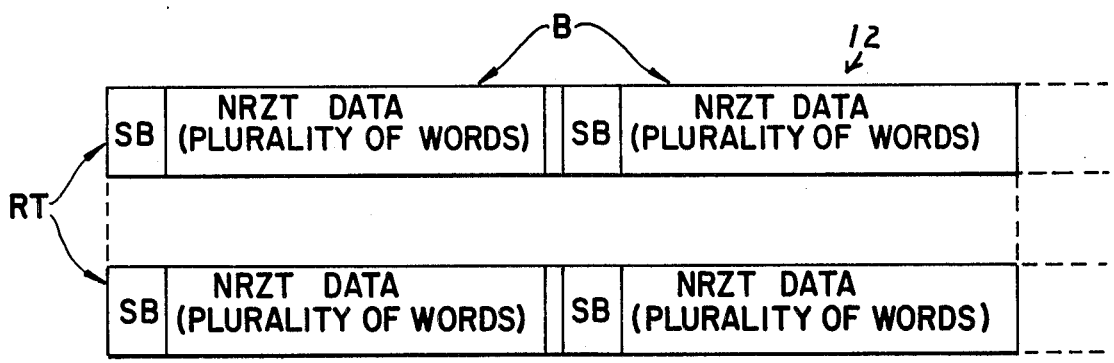
FIG. 2

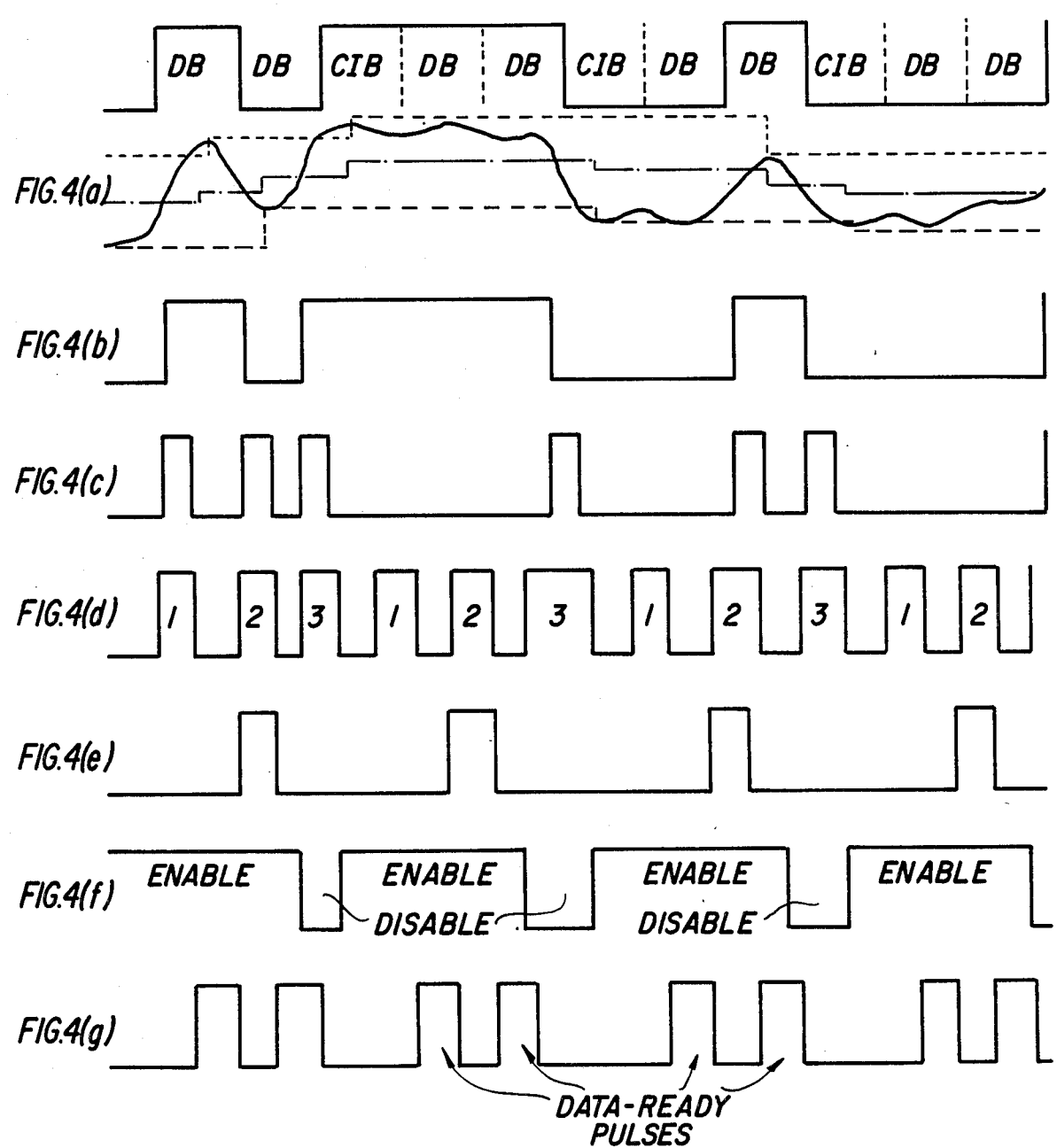

DATA ENCODING AND DECODING SCHEME

FIELD OF THE INVENTION

The present invention relates generally to data encoding and decoding schemes and, more particularly, to a digital data format and apparatus for decoding the digital data.

BACKGROUND OF THE INVENTION

As the state-of-the-art is advanced in high-technology electronics in general, and computer systems in particular, more products based on this technology are becoming available to the consumer. For example, small-size and low-cost consumer electronics products can now be conveniently installed in vehicles, either as original equipment or in the aftermarket. A computerized vehicle navigation system which assists a driver to keep track of the location of the vehicle is one example of such a product. The vehicle navigation system may include a computer, a display and a data storage medium which stores information, such as a digitized map of streets. The computer will process the map data, together with other information representing the actual location of the vehicle, to provide a display of the map and a symbol showing the position of the vehicle relative to the streets being navigated. The data storage medium may be, for example, a tape cartridge or tape cassette that is read by tape read circuitry placed in the passenger compartment.

For computer systems which are used generally in many different environments, data are encoded or formatted on data storage media in a variety of ways, one of which, for example, is to add to the data, clock information that is decoded by the computer to properly process the data. Unique data encoding and decoding problems arise in the vehicle use environment, particularly if the computer system includes a tape cassette and a magnetic head to read the tape. One problem is that the vehicle use environment is a high shock and vibration environment, which can result in the tape undesirably moving relative to the head. This means that the data should be formatted to allow the read system to be able to read and acquire accurate reference information about the position of the tape, which is difficult in such an environment. Another problem of the vehicle use environment is in keeping the amount of tape read circuitry necessary to decode the data at a minimum and in keeping it simple, thereby minimizing cost to the consumer and facilitating repair or replacement, if necessary. Yet another problem is that a computer system used in the vehicle environment is subject to signal noise; therefore, the required bandwidth for the data format should be narrow since a narrow bandwidth reduces the noise power that can effect decoding of the data.

SUMMARY OF THE INVENTION

It is an object of the present invention to provide a novel digital data encoding and decoding scheme.

Another object of the present invention is to provide an encoding and decoding scheme for use in a relatively high shock and vibration environment.

Still another object of the present invention is to provide a relatively simple and cost-effective encoding and decoding scheme.

The above and other objects of the present invention are obtained in one aspect of the present invention which constitutes a data storage medium having a plurality of bit cells for storing data bits and clock information bits; groups of n data bits, each group being stored over n consecutive bit cells, respectively; and a clock information bit stored between the groups of n data bits at every n+1 bit cell.

In yet another aspect, the invention constitutes an apparatus for decoding digital data stored on the above-mentioned data storage medium, including means for reading the digital data stored on the data storage medium and for producing an analog signal corresponding to the n data bits and the clock information bit; means for outputting the digital data in response to the analog signal; and means, responsive to the digital data being outputted, for producing data-ready pulses at a time corresponding to the bit cells storing the n data bits and for inhibiting the data-ready pulses at a time corresponding to the bit cell storing the clock information bit.

BRIEF DESCRIPTION OF THE DRAWINGS

FIG. 1A shows one embodiment of the data format of the present invention.

FIG. 1B illustrates one example of digital data formatted in accordance with the present invention.

FIG. 2 illustrates generally the storage of data on a data storage medium.

FIG. 4 consisting of 4(a) through 4(g) is a diagram showing various waveforms produced in the decoding apparatus of FIG. 3.

DETAILED DESCRIPTION OF THE INVENTION

Figure 3:
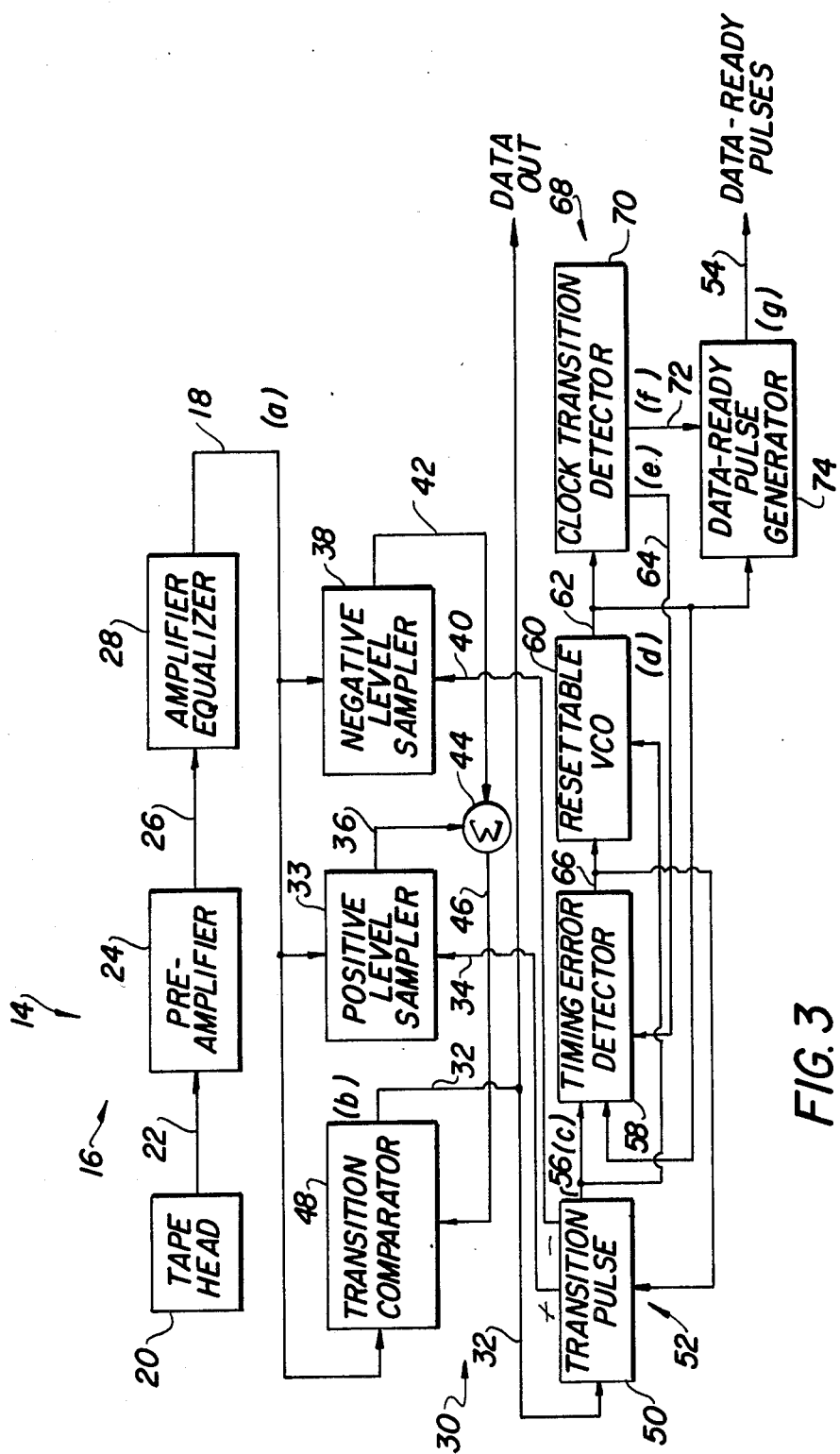
FIG. 3 is a block diagram of one embodiment of decoding apparatus of the present invention.

FIG. 1A is used to explain one example of data encoded or formatted in accordance with the principles of the present invention. Thus, FIG. 1A shows generally a data storage medium 10 which may be, for example, magnetic tape provided on a tape cassette or cartridge, or a floppy or hard disk. The data storage medium 10 has a plurality of bit cells BC, each of which corresponds to a surface on the medium 10 devoted to defining a logic 1 or logic 0 bit. Each bit cell BC will store either a data bit DB or a clock information bit CIB. A data bit DB corresponds to one bit of a digital data word stored on the medium 10, while a clock information bit CIB constitutes data to provide the digital data word with data-ready pulses, as will be further described.

Generally, the data are formatted such that there are groups of n data bits DB stored over n consecutive bit cells BC, and a clock information bit CIB stored between the groups of n data bits at every n+1 bit cell BC. As shown by the one example in FIG. 1A, n=2. Thus, reading from left to right, there is a Group I of two data bits DB followed by a clock information bit CIB, followed by two data bits DB of a Group II followed by a clock information bit CIB, etc.

Furthermore, and as one example, the clock information bit CIB is such that its logic level (1 or 0) is the opposite of the logic level of the next preceding data bit DB. In other words, the data format guarantees that there is a transition in logic level at every n+1 bit cells BC which stores the clock information bit CIB.

FIG. 1B illustrates a digital data word of N-bit length (e.g. N=8) which is formatted on the medium 10 in accordance with the present invention. In the example of FIG. 1B, the digital data word is, logically, 10110100. Thus, reading left to right, the format is such that data bits (DB) 10 are stored on the two consecutive bit cells BC of Group I, followed by the clock information bit CIB, followed by data bits (DB) 11 stored on the two consecutive bit cells BC of Group II, etc. As shown in FIG. 1B, each clock information bit CIB has a logic transition to the opposite logic level of the next preceding data bit DB. Thus, for example, reading left to right, the first clock information bit CIB is a logic 1 since the next preceding data bit DB of Group I is at logic 0. The next clock information bit CIB is at logic 0 since the next preceding data bit DB of Group II is at logic 1, etc.

Furthermore, as one example, the digital data word shown in FIG. 1B is encoded as a nonreturn-to-zero (NRZ) code. This is shown, for example, by there being no return to zero between the two consecutive logic 1 data bits DB of Group II, so that this portion of the NRZ code appears to be a single pulse.

The preferred embodiment of the present invention is to utilize an NRZ code, together with the guaranteed transition of each clock information bit CIB. Thus, the applicant has termed such a coding scheme as NRZT, where T stands for transition.

FIG. 2 is used to illustrate generally a magnetic tape 12 which may have a plurality of recording tracks RT. Each track RT will have at least one block B which includes, among other information, synchronization bits SB that are used to initiate timing circuitry as more fully described below, and a plurality of NRZT words. A given NRZT word is stored on a single track RT.

FIG. 3 shows one embodiment of an apparatus 14 for decoding a given NRZT word, such as the data shown in FIG. 1B. FIG. 4 shows waveforms (a)-(g) (with reference to the example of FIG. 1B) that are produced at various locations of the apparatus 14, as indicated in FIG. 3.

The apparatus 14 includes a means, shown generally at 16, for reading the digital data stored on the data storage medium 10 and for producing an analog signal on an output line 18 corresponding to the n data bits DB and each clock information bit CIB. This analog signal on line 18 is shown in solid lines as waveform (a) of FIG. 4 and has positive and negative levels relative to each other. The means 16 includes a tape head 20 that reads the data storage medium 10 and outputs a signal on a line 22, which signal is then amplified by a pre-amplifier 24 and outputted on a line 26. An amplifier-equalizer 28 then provides another stage of signal amplification and equalizes the signal on the line 26. In performing the equalization function, the amplifier-equalizer 28 boosts the amplitude of the low frequency components of the signal on line 26 to limit the speed required to track the center of the waveform (a) on line 18 which is described below.

The apparatus 14 also includes a means shown generally at 30, responsive to the analog signal on line 18, for reconstructing and outputting on a line 32 (see waveform b) substantially the same NRZT data stored on medium 10. The means 30 includes a positive level sampler 33 which receives the analog signal on line 18 and an enabling signal on an input line 34. The positive level sampler 33 samples the positive voltage level of the analog signal on line 18, to provide a sampled positive level signal on an output line 36, as shown by the dotted lines of waveform (a) of FIG. 4. The enable signal on line 34, at its leading edge, enables the positive level sampler 33 at a negative-to-positive transition and, until its trailing edge, allows the level sampler 33 to track the analog signal for a one-half bit cell BC prior to the sampler 33 holding the positive level.

A negative level sampler 38 receives the analog signal on the line 18 and an enabling signal on an input line 40. The negative level sampler 38 samples the negative voltage level of the analog signal on line 18 to provide a sampled negative level signal on an output line 42, as shown by the dashed lines of waveform (a). The enable signal on line 40, at its leading edge, enables the negative level sampler 38 at a positive-to-negative transition and, until its trailing edge, allows the level sampler 38 to track the analog signal for a one-half bit cell BC prior to the sampler 38 holding the negative level. The width of the enable signal on line 40, as well as the enable signal on line 34, is controlled, as described below. A summer 44 then sums the sampled positive level signal on line 36 and the sampled negative level signal on line 42 to produce an average output signal on a line 46 which is a reference signal that tracks the center of the analog signal on line 18, as shown in the chain-dotted line of waveform (a).

A comparator 48 has one input coupled to the line 18 and another input coupled to the line 46. The comparator 48 compares the analog signal on line 18 with the reference signal on line 46 to produce logic 1 level or logic 0 level output pulses on the line 32 each time there is a transition of the analog signal going below or above the reference signal, as shown by waveform (b) of FIG. 4.

Furthermore, the means 30 includes a transition pulse generator 50 which has one input coupled to the line 32 and two outputs coupled, respectively, to line 34 and line 40. The transition pulse generator 50 generates the enabling pulse on line 34 to enable the positive level sampler 33 to track the analog signal on line 18 when the output pulses of the waveform (b) on line 32 indicate that the analog signal on line 18 is in transition to go from a negative level to a positive level, i.e., at the leading edge of each pulse of waveform (b). The transition pulse generator 50 also generates the enabling signal on line 40 when the output pulses of waveform (b) on line 32 indicate that the analog signal on line 18 is going from a positive level to a negative level, i.e., at the trailing edge of each pulse of waveform (b).

The apparatus 14 also includes a means shown generally at 52 for producing data-ready pulses on the output line 54 in synchronization with the output pulses on line 32. The transition pulse generator 50 may be considered to be included as well in the means 52 in that it generates on an output line 56 the pulses of waveform (c) of FIG. 4 whenever there is a positive going or negative going transition of the analog signal on line 18. A timing error detector 58 has one input coupled to the line 56 and another input coupled to the output of a resettable voltage controlled oscillator (VCO) 60 over a line 62. This latter line 62 carries a pulse train signal shown by waveform (d) of FIG. 4 which reflects the current average bit cell rate being read. The timing error detector 58 is enabled at a certain time, as will be described below, by an enabling pulse received on a line 64 as shown by waveform (e) of FIG. 4. The timing error detector 58 produces a control signal on a line 66 to control the VCO 60, as will be described below. The control signal on line 66 is also fedback to the transition pulse generator 50, whereby the pulse widths of the enabling signals on lines 34 and 40, respectively, are controlled or set to the average half-bit cell times.

Once enabled, the timing error detector 58 detects which pulse (on line 56 or line 62) is encountered first. If the transition pulse is detected first (line 56) it means that the clock information bits CIB are coming at a rate faster than the pulse repetition rate (line 62) set by the VCO 60 and the control signal (line 66) is incremented to slightly increase the repetition frequency. If the VCO pulse (line 62) is encountered first it means that the clock information bits CIB are coming at a rate slower than the pulse repetition rate set by the VCO 60 and the control signal (line 66) is decremented to slightly decrease the repetition frequency.

The resettable VCO 60 generates the pulse train (line 62) approximately in synchronism to the bits being read from tape. The repetition rate of the pulse train, as previously mentioned, is set by the VCO 60 which is controlled via line 66. In addition, the start or phase of each pulse (line 62) is controlled by the VCO 60 and line 56. The VCO 60 sets the maximum time between pulses. If no pulse on line 56 is detected before this time, a pulse is generated by the VCO 60 on line 62 and a timer (not shown) in the VCO 60 is reset. If a pulse on line 56 is detected, a pulse on line 62 is generated and such a timer is reset.

A clock transition detector 68, such as a counter 70, counts the pulses on line 62. The counter 70 produces the timing error enable pulse on line 64, and data-ready pulse generator enabling and disabling pulses on an output line 72, as shown by waveform (f) of FIG. 4, depending on whether a clock information bit CIB is read from the medium 10. As indicated above as one example, the clock information bit CIB is stored at every third bit cell BC. Accordingly, the counter 70 may be a modulo-3 counter. At every third pulse on line 62 corresponding to the clock information bit CIB, the counter 70 outputs a disabling signal on line 72 while at other times an enabling signal is produced on line 72; see waveform (f). When the counter 70 is at a count of 2, the timing error detection enable pulse is produced on line 64 to enable the timing error detector 58, whereby the latter determines which pulse on line 56 or line 62 is first.

A data ready pulse generator 74 produces the data ready pulses on line 54, as shown by waveform (g) of FIG. 4, in response to the bit cell pulse signal on line 62, and is enabled or disabled by the signals on line 72. Thus, at every third bit cell BC, corresponding to the clock information bit CIB, the data ready pulse generator 74 is disabled and no pulse appears on line 54. At the bit cell times corresponding to the data bits DB, the data ready pulse generator 74 is enabled, so that data ready pulses on line 54 are produced, thereby providing each data bit DB with a data ready pulse. The leading edge of the data ready pulse is delayed by, for example, generator 74, by one-half bit cell to appear nominally at the center of a given bit cell BC for the data bit DB.

As previously mentioned and illustrated in FIG. 2, each block B has synchronization bits SB. For example, there are at least three such bits SB. These bits SB are coded so that no transitions occur for at least these bit cells BC followed by the first clock information bit CIB. These bits SB are read by the apparatus 14 in the same manner as the NRZT data for timing purposes including synchronizing the counter 70 prior to reading the NRZT data.

The encoding and decoding scheme of the present invention provides a number of advantages. By guaranteeing a transition T of the data at every third bit cell BC, a reference position of the data storage medium 10 in general or the magnetic tape 12 in particular is accurately acquired via this transition T, as is needed for high shock and vibration environments. Furthermore, by using only one overhead bit, (i.e., one clock information bit CIB) for every two data bits DB, the required bandwidth is narrow. In addition, the result of the encoding and decoding scheme is to produce a data ready pulse nominally within the center of a bit cell BC for a data bit DB, as may be seen by comparing waveforms (b) and (g), whereby the relative timing accuracy requirement for decoding the digital data is only ± one half bit cell BC.

Furthermore, the apparatus 14 is relatively simple and inexpensive, thereby making it very suitable for use in consumer and commercial vehicles such as an automobile, recreational vehicle (RV), truck, etc. In this connection, FIG. 2 shows a multi-track tape 12. Consequently, for example, the tape head 20 of apparatus 14 may be a plurality of tape heads or tape head tracks for reading the multi-tracks RT of the tape 12. The apparatus 14 then may be modified to place a one-of-multi track select switch between preamplifier 24 and amplifier-equalizer 28 to select and process one track at a time with the remaining apparatus 14. Alternatively, the apparatus 14 may be duplicated for each recording track RT.

As one specific application, the magnetic tape 12 can be in a cassette which is read by the tape read apparatus 14 that is placed in the passenger compartment of an automobile. In addition, the automobile will have a computer (not shown) and a display (not shown) to process the N-bit data words of the NRZT digital data and display the results. For example, the N-bit data words of the digital data may identify streets of a map corresponding to the geographical area over which the vehicle may move.

The foregoing description of preferred embodiments of the invention has been presented for purposes of illustration and description. It is not intended to be exhaustive or to limit the invention to the precise form described, and many modifications and variations are possible in light of the above teaching. The embodiments were chosen and described in order to best explain the principles of the invention and its practical application to thereby enable others skilled in the art to best utilize the invention in various embodiments and with various modification as are suited to the particular use contemplated. It is intended that the scope of the invention be defined by the claims appended hereto.

I claim:

1. Apparatus for decoding digital data stored on a data storage medium, the digital data including a NRZ data word having groups of n data bits, each group being stored over n consecutive bit cells, respectively, and including a clock information bit stored between said groups at every n+1 bit cell, comprising:
   (a) means for reading the digital data stored on the data storage medium and for producing an analog signal corresponding to the n data bits and the clock information bit, wherein the analog signal has positive and negative levels;
   (b) means for outputting the digital data in response to the analog signal, including (i) means for generating a reference signal tracking the average of the positive and negative levels of the analog signal; and (ii) means for comparing the analog signal with the reference signal and for generating output pulses upon transitions, respectively, of the analog signal going above or below the reference signal, the output pulses being the outputted digital data; and (c) means, responsive to the digital data being outputted, for producing data-ready pulses at a time corresponding to the bit cells storing the n data bits and for inhibiting the data-ready pulses at a time corresponding to the bit cell storing the clock information bit.

2. Apparatus, according to claim 1, wherein said means for generating a reference signal comprises:

(a) first means for sampling the positive levels of the analog signal to provide a sampled positive level signal;

(b) second means for sampling the negative levels of the analog signal to provide a sampled negative level signal; and (c) means for summing and averaging the sampled positive level signal and the sampled negative level signal.

3. Apparatus, according to claim 1 wherein said first means for sampling comprises:

(a) a positive level sampler; and (b) means, responsive to the output pulses, for generating enabling signals to enable said positive level sampler.

4. Apparatus, according to claim 1, wherein said second means for sampling comprises:

(a) a negative level sampler; and (b) means, responsive to the output pulses, for generating enabling signals to enable said negative level sampler.

5. Apparatus for decoding digital data stored on a data storage medium, the digital data including a NRZ data word having groups on n data bits, each group being stored over n consecutive bit cells, respectively, and including a clock information bit stored between said groups at every n+1 bit cell, comprising:

(a) means for reading the digital data stored on the data storage medium and for producing an analog signal corresponding to the n data bits and the clock information bit; wherein the analog signal has positive and negative levels;

(b) means for outputting the digital data in response to the analog signal; and (c) means, responsive to the digital data being outputted, for producing data-ready pulses at a time corresponding to the bit cells storing the n data bits and for inhibiting the data-ready pulses at a time corresponding to the bit cell storing the clock information bit, including (i) means for generating transition pulses upon the transitions of the analog signal between the positive and negative levels;

(ii) controllable means for producing a pulse train waveform in response to the transition pulses;

(iii) means for generating the data-ready pulses in response to the pulse train waveform; and (iv) means for detecting each clock information bit in response to the pulse train waveform, said detecting means disabling said data-ready pulse generating means upon detecting the clock information bit and enabling said data-ready pulse generating means in the absence of detecting each clock information bit.

6. Apparatus, according to claim 5, wherein said controllable means for producing a pulse train waveform comprises:

(a) a voltage controlled oscillator for generating the pulse train waveform;

(b) means for generating an enabling signal at a time related to the occurrence of each clock information bit; and (c) means, enabled in response to the enabling signal, for detecting which pulse occurs first between one of the transition pulses and one of the pulses of the pulse train waveform to produce an error signal, said voltage controlled oscillator being controlled in response to the error signal, and said voltage controlled oscillator resetting the pulse train waveform upon the absence of one of the transition pulses within a maximum time or resetting the pulse train waveform in response to the occurrence of one of the pulses within the maximum time.

7. Apparatus for decoding NRZT digital data stored on a magnetic data storage tape usable in a high shock and vibration environment, the magnetic data storage tape having a plurality of bit cells and the NRZT digital data including an NRZ data word having at least one group of n data bits stored over n consecutive bit cells, respectively, in which n≧2, and a clock information bit stored between each group of n data bits at every n+1 bit cell, the clock information bit having a logic level transition so that the logic level of the clock information bit is the opposite of the logic level of the data bit of the bit cell next preceding the clock information bit, the apparatus comprising:

(a) means for reading the NRZT digital data stored on the magnetic data storage tape and for producing an analog signal corresponding to the NRZT digital data, the analog signal having positive and negative levels;

(b) means for reconstructing the NRZT digital data stored on the tape in response to the analog signal, including (i) means for generating a reference signal tracking the average of the positive and negative levels of the analog signal; and (ii) means for comparing the analog signal with the reference signal and for generating output logical 1 level and logical 0 level pulses upon transitions, respectively, of the analog signal going above and below the reference signal, the output logical pulses being substantially the same as the NRZT digital data; and (c) means, responsive to the output logical pulses, for producing data-ready pulses at a time corresponding to the bit cells storing the n data bits and for inhibiting the data-ready pulses at a time corresponding to the bit cells storing the lock information bit, including (i) means for generating transition pulses upon the transitions of the analog signal between the positive and negative levels;

(ii) controllable means for producing a pulse train waveform in response to the transition pulses;

(iii) means for generating the data ready pulses in response to the pulse train waveform; and (iv) means for detecting each clock information bit in response to the pulse waveform, said detecting means disabling said data ready pulse generating means upon detecting each clock information bit and enabling said data ready pulse generating means in the absence of detecting each clock information bit.

8. Apparatus, according to claim 7, wherein said means for generating a reference signal comprises:
(a) a positive level sampler for sampling the positive levels of the analog signal to provide a sampled positive level signal;
(b) a negative level sampler for sampling the negative levels of the analog signal to provide a sampled negative level signal;
(c) a transition pulse generator, responsive to the output pulses, for generating enabling signals to enable said positive level sampler and said negative level sampler, respectively; and
(d) a summer for averaging the sampled positive level signal and the sampled negative level signal.

9. Apparatus, according to claim 7, wherein said controllable means for producing a pulse train waveform comprises:

(a) a phase resettable voltage controlled oscillator for outputting the pulse train waveform at a controlled pulse repetition frequency;
(b) a clock transition detector for generating an enabling signal at a time related to the time of occurrence of each clock information bit; and
(c) a timing error detector, being enabled in reponse to the enabling signal, for producing an error signal in response to an earlier pulse between one of the transition pulses of said pulse transition generating means and one of the pulses of the pulse train waveform, the controlled pulse repetition frequency of said resettable voltage controlled oscillator being adjustable in response to the error signal.

10. Apparatus, according to claim 9, wherein said clock transition detector comprises a modulo counter.

11. Apparatus, according to claim 7, wherein said modulo counter is a modulo 3 counter.

12. Apparatus, according to claim 7, wherein the magnetic data storage tape further stores a plurality of synchronization bits stored, respectively, over a plurality of the bit cells, and wherein said means for detecting each clock information bit is synchronized in response to the plurality of synchronization bits.

* * * * *